(12) United States Patent
MacKay et al.

(10) Patent No.: US 8,505,862 B2
(45) Date of Patent: Aug. 13, 2013

(54) QUICK-RELEASE RETAINING BRACKET

(76) Inventors: Cameron Richard MacKay, Surrey (CA); Yuerong Wang, Shanghai (CN); Harley Edward Kelsey, Vancouver (CA)

( * ) Notice: Subject to any disclaimer, the term of this patent is extended or adjusted under 35 U.S.C. 154(b) by 0 days.

(21) Appl. No.: 13/124,004

(22) PCT Filed: Oct. 15, 2008

(86) PCT No.: PCT/CA2008/001813
§ 371 (c)(1),
(2), (4) Date: Oct. 21, 2011

(87) PCT Pub. No.: WO2010/043016
PCT Pub. Date: Apr. 22, 2010

(65) Prior Publication Data
US 2012/0067836 A1    Mar. 22, 2012

(51) Int. Cl.
*A47B 96/06* (2006.01)
*B25B 1/08* (2006.01)
*B25B 5/08* (2006.01)
*F16M 11/00* (2006.01)

(52) U.S. Cl.
USPC ....... 248/225.11; 248/200; 269/229; 269/236

(58) Field of Classification Search
USPC .............. 248/200, 222.12, 247, 298.1, 316.4, 248/224.8, 222.41, 223.21, 225.11; 403/321, 403/353, 376; 269/229, 903, 105, 236; 396/419–428
See application file for complete search history.

(56) References Cited

U.S. PATENT DOCUMENTS

| | | | |
|---|---|---|---|
| 3,787,022 A * | 1/1974 | Wilcox | 251/212 |
| 4,645,166 A | 2/1987 | Checkley et al. | |
| 6,740,851 B2 | 5/2004 | Woodlief et al. | |
| 7,150,578 B2 | 12/2006 | Porco | |
| 7,334,766 B2 * | 2/2008 | Ligertwood | 248/292.13 |
| 2006/0054848 A1 * | 3/2006 | Vogt | 251/77 |

* cited by examiner

*Primary Examiner* — Jonathan Liu
*Assistant Examiner* — James Twomey
(74) *Attorney, Agent, or Firm* — Sampson & Associates, P.C.

(57) ABSTRACT

A quick-release retainer bracket for mounting objects to a platform, has a base plate enclosing a pocket in a center thereof, and a pair of retainer plates positionable on top of said base plate on opposed sides thereof, the base plate and retainer plates mountable on a platform with the retainer plates moveable over the base plate from a retracted position in which the retainer plates are partially overlapping a pocket to an extended region in which the retainer plates do not overlap the pocket.

8 Claims, 7 Drawing Sheets

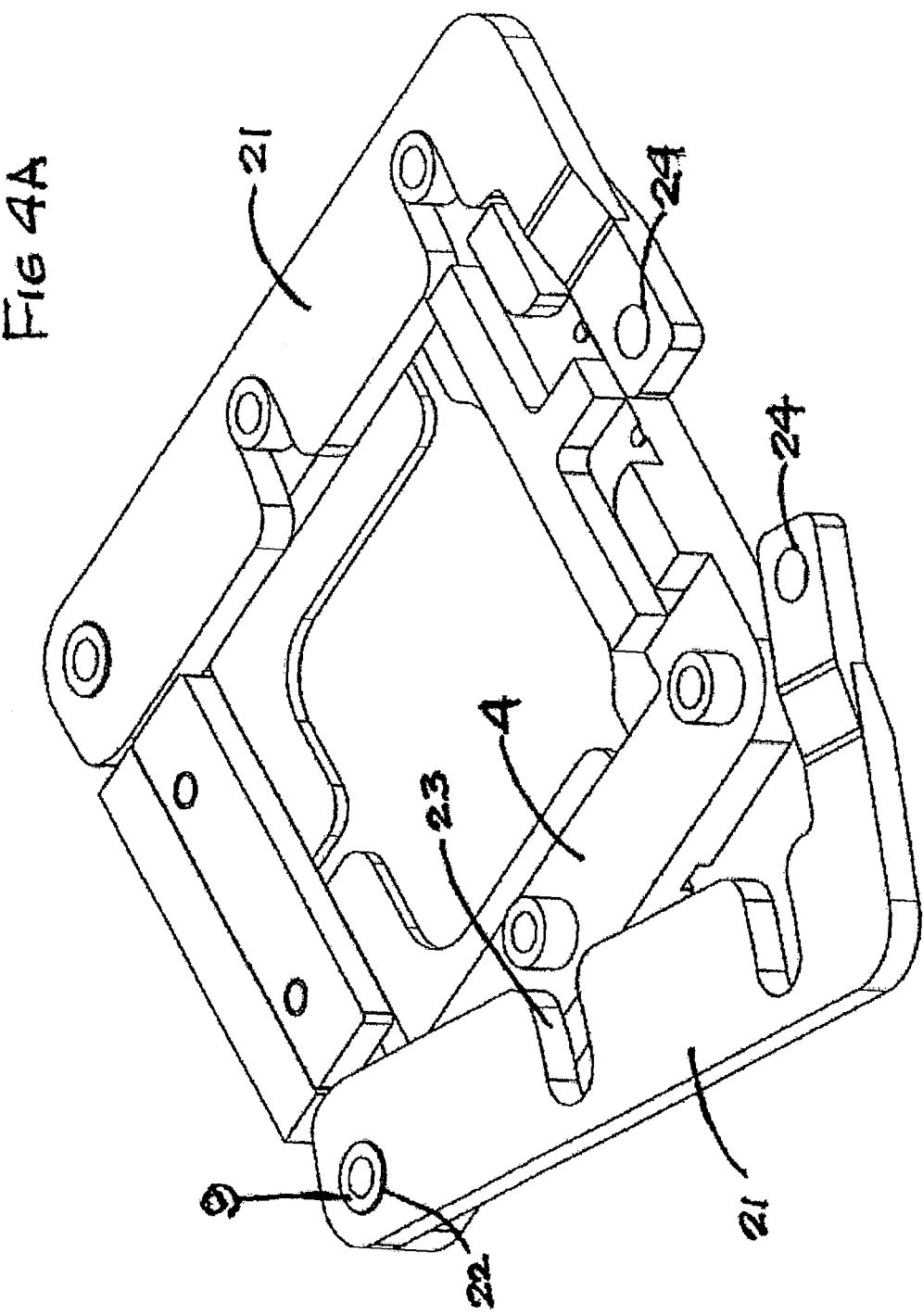

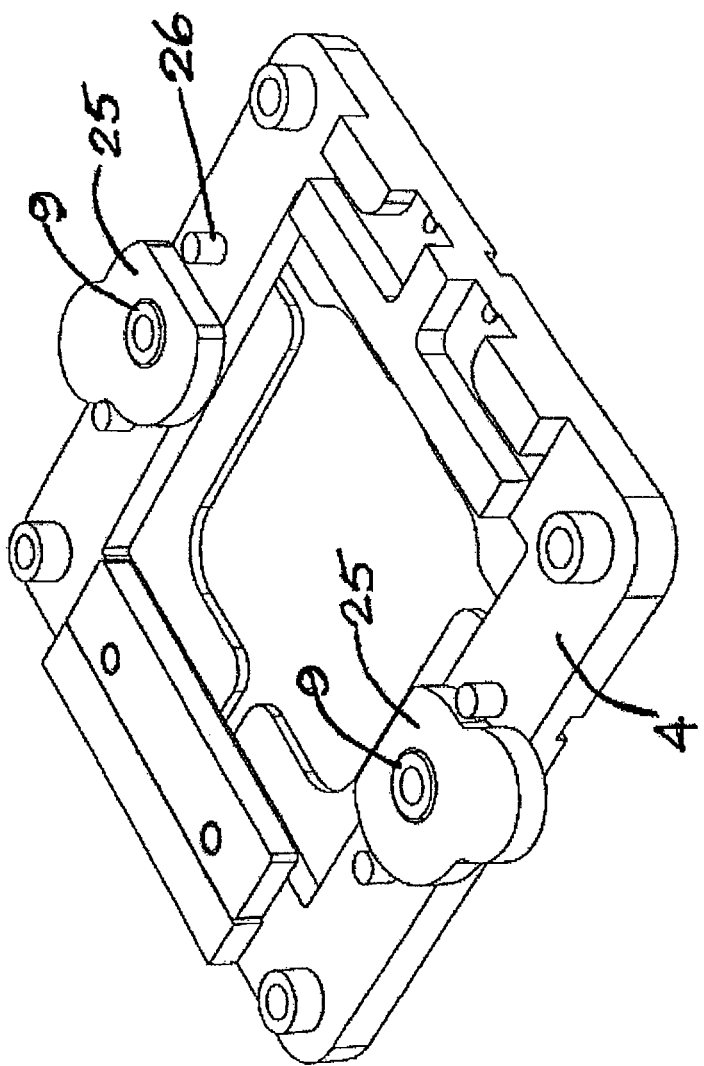

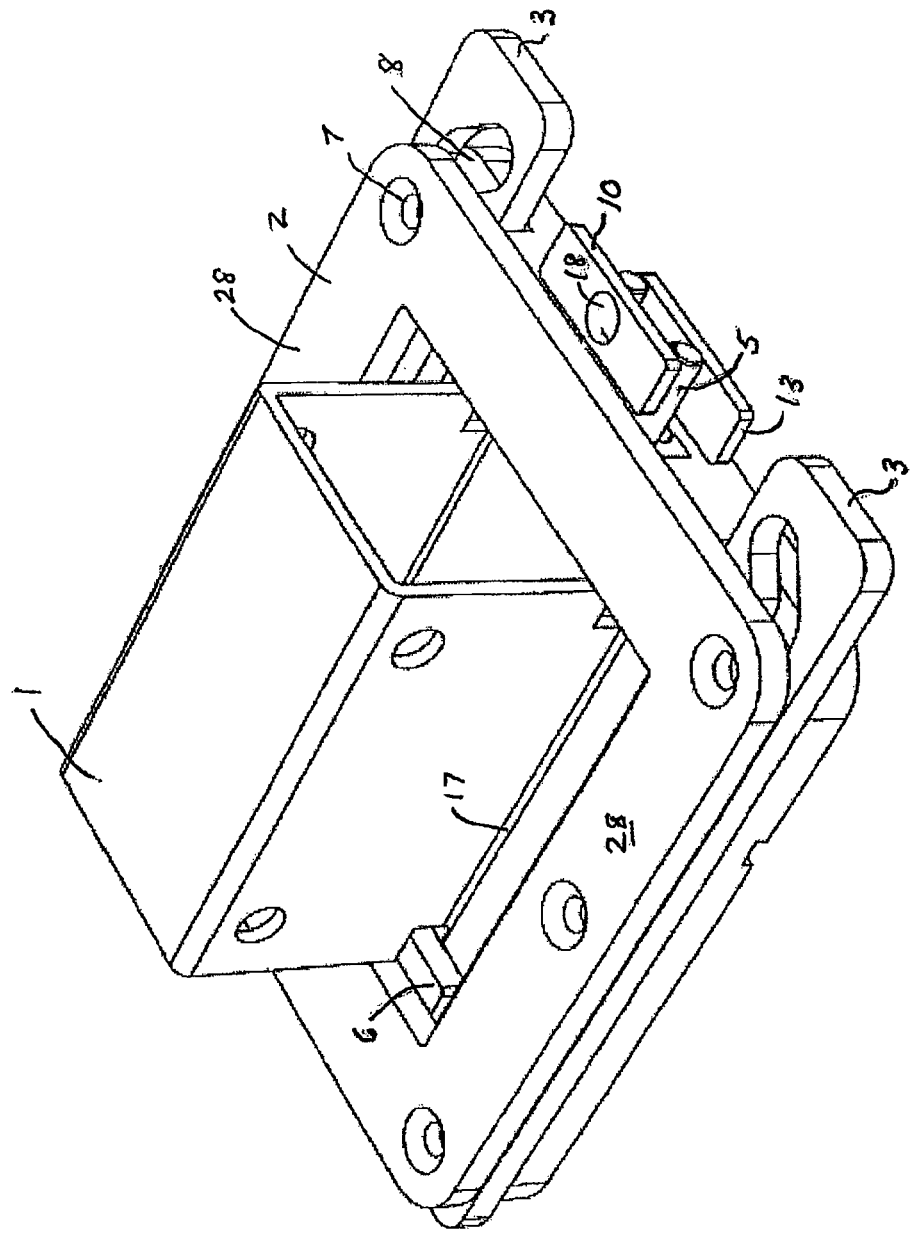

QUICK-RELEASE RETAINING BRACKET

FIELD

The present invention relates to a quick-release retaining bracket for mounting equipment on a surface or platform. The bracket can be easily released or locked manually with hands or feet and without special tools.

BACKGROUND

It is known to attach accessories to boats by using mechanical clamps with fasteners to secure the accessory to the boat. It is important in marine applications to have all loose equipment tied or locked to the deck or other platform affixed to the boat. It is also important that any clamping devices used to lock the equipment to the boat be of a low-profile so that the locking device itself doe not become a dangerous obstruction. Retainer brackets of such locking devices must be strong enough to withstand the vibration of the motor and the impact of the water, particularly when used for heavy equipment. Often, to achieve the required strength and rigidity, tools are required to loosen the clamp. Unfortunately, when working with fasteners and tools, the fasteners and/or tools are often dropped overboard. Accordingly, it is desirable to be able to operate the bracket or clamp without tools and for the bracket itself not to have any loose parts.

To be viable in the marketplace, a clamp should be also be suitable for use with non-marine equipment such as industrial power tools, truck mounted hoists, ladders, and load bearing shelves. A clamp should be capable of clamping and unclamping equipment during daily operations.

SUMMARY OF THE INVENTION

The present invention relates to a quick-release retaining bracket to mount items such as fishing gear, outboard motors, railings and other marine related hardware to the boat hull, deck, railing, dock, or similar marine platforms. This invention can also be used in industrial and commercial applications where equipment must be mounted and unmounted during the daily operation of such equipment. Truck mounted hoists, ladder locks, load bearing shelves, and industrial power tool locks are typical examples. The bracket and adapters can be made in sizes to suit the loading and application conditions.

According to the invention there is provided a quick-release retainer bracket for mounting objects to a platform. The retainer bracket has a base plate enclosing a pocket in a center thereof, and a pair of retainer plates positionable on top of said base plate on opposed sides thereof. The base plate and retainer plates can be mounted on a platform with retainer plates moveable over the base plate from a retracted position in which the retainer plates are partially overlapping the pocket to an extended region in which said retainer plates do not overlap the pocket.

The retaining and locking mechanism holds an equipment adapter firmly in the bracket. When the equipment adapter is inserted in the bracket pocket, the bracket locking plates are moved into a position over two sides of the foot plate of the equipment adapter. This configuration of the invention provides high shear strength in bolting the bracket to the floor or mounting platform. This high shear strength is carried through the retaining and locking plates that hold an equipment adapter in the bracket pocket. This allows the invention to retain and carry heavy loads and equipment.

The present invention provides a rapid and reliable quick-release mounting bracket for seats, marine, and industrial equipment where mounting and dismounting during use or operation is required. The bracket has a low profile that does not intrude in the traffic or work space when not in use. The invention does not require special tools to operate and can be locked for security reasons.

Another unique feature of the invention is that the bracket can be locked or unlocked without tools and with either a person's hands or feet. The "Hands Free" operation makes it easy for a user to hold and position the equipment adapter in the bracket with both hands, and retain and lock the equipment with a kick of their foot. Equipment can be released with another kick of the foot. This is a positive safety feature when working in industry, especially construction A top plate of the bracket can be positioned over retainer plates with mounting fasteners engaging the top plate, retainer plates and base plate with the platform.

The retaining plates slide guided by slots engaging pivot pins which extend up from the base plate through slots in the retainer plates.

Alternatively, the retaining plates may pivot on the guide bushings to lock the object in the bracket pocket. The retaining plates may also rotate on the guide bushings to lock the object in the bracket pocket.

The retaining plates move into the bracket pocket over the equipment adapter base plate to hold the adapter in the pocket. This movement inwarrdly and outwardy is accomplished by a linear displacement of the retaining plate with slots cut into the retaining plates that use the hold-down bolts as guide bushings. The locking movement is a sliding action on the retaining plates. In another variation, the retaining plates use a pivoting action on a corner hold-down bolt bushing and swing inward on slots the clear the other hold-down bolt bushings. In another retainer plate movement rotary disks rotate off-center on the bolt bushings to move in and out over the adapter base plate.

A stationary retaining plate may extend across from one side of the base plate to another at one end thereof. The mounting strength of the invention's two retaining and locking plates can be increased in another refinement of the invention by adding a third retaining plate. The equipment bracket insert is then held in the bracket on three sides and can still be quick-released.

The base plate and guide bushings are made of a material deformable under compression so a force required to open or close the retaining plates may be adjusted. Preferably, the material is plastic.

The use of a plastic base plate allows adjustment of the force needed to open and close the retaining plates. The base plate for the quick-release bracket can be made of several kinds and types of metal or plastic to suit the environmental conditions of the installation, such as high temperature, chemical corrosion, UV degradation from sunlight, saltwater corrosion and other reactions. With a plastic base plate, the force required to open or close the bracket retainer plates can be adjusted simply by tightening or loosening the bracket hold-down bolts or screws. Tightening the bolts compresses the plastic bushing around each bolt and reduces the clearance between the bracket top plate and the moving retainer plate. This creates more movement friction between the top and bottom surface of the retainer plate in the bracket. Loosening the bolts reduces this friction. In installations where there is limited vibration or stationary mounting, higher friction locking without a security lock pin mechanism in the bracket is practical and still secure against tampering because of the force required to open the bracket The retainer and base plates have a plurality of locking bolt holes which allow bolts to clamp the top plate to an underlying platform and thereby provide shear resistance.

The base plate has pin receptacles which each receive a locking pin. A distal end of the locking pins releasably engage a corresponding notch in an inside edge of each of the retainer plates.

To an opposite end of the locking pins are affixed pads which when moved laterally, move the locking pins into and out of engagement with notches in the retainer plates.

Simple lock-pins prevent the bracket retaining plates from opening and releasing the equipment insert. This security feature is an advantage over brackets currently in use. By squeezing the two lock pin tabs or pushing each tab with one's foot, the retaining plates can be locked in position or released from the locked state.

The pads each have a hole and the holes are aligned with the pins when the pins engage the notches. The hole in the pads can receive a padlock when the retainer plates are in position.

A wide variety of equipment inserts can be used with the quick-release bracket. Boat seat mounts, fishing gear, truck and boat hoists, shelving, equipment mounts, aircraft and boat tie-downs are typical applications. The bracket can also be made in a wide range of sizes and shapes.

The quick-release bracket can be made with a variety of metals and plastics. Assembly of the bracket occurs when the bracket is bolted to a platform so there is little factory assembly required other than packaging.

BRIEF DESCRIPTION OF THE DRAWINGS

Further features and advantages will be apparent from the following detailed description, given by way of example, of a preferred embodiment taken in conjunction with the accompanying drawings, wherein:

FIG. 4A shows a pivoting action feature to move a open slot type retaining plate into the insert retaining position;

FIG. 4B shows a rotating action feature to move a tab type retaining plate into the insert retaining position; and FIG. 5 shows a typical assembly of the quick-release bracket with sliding retaining plates holding a typical equipment adapter.

DETAILED DESCRIPTION OF THE FEATURES OF THE INVENTION

Figure 1:
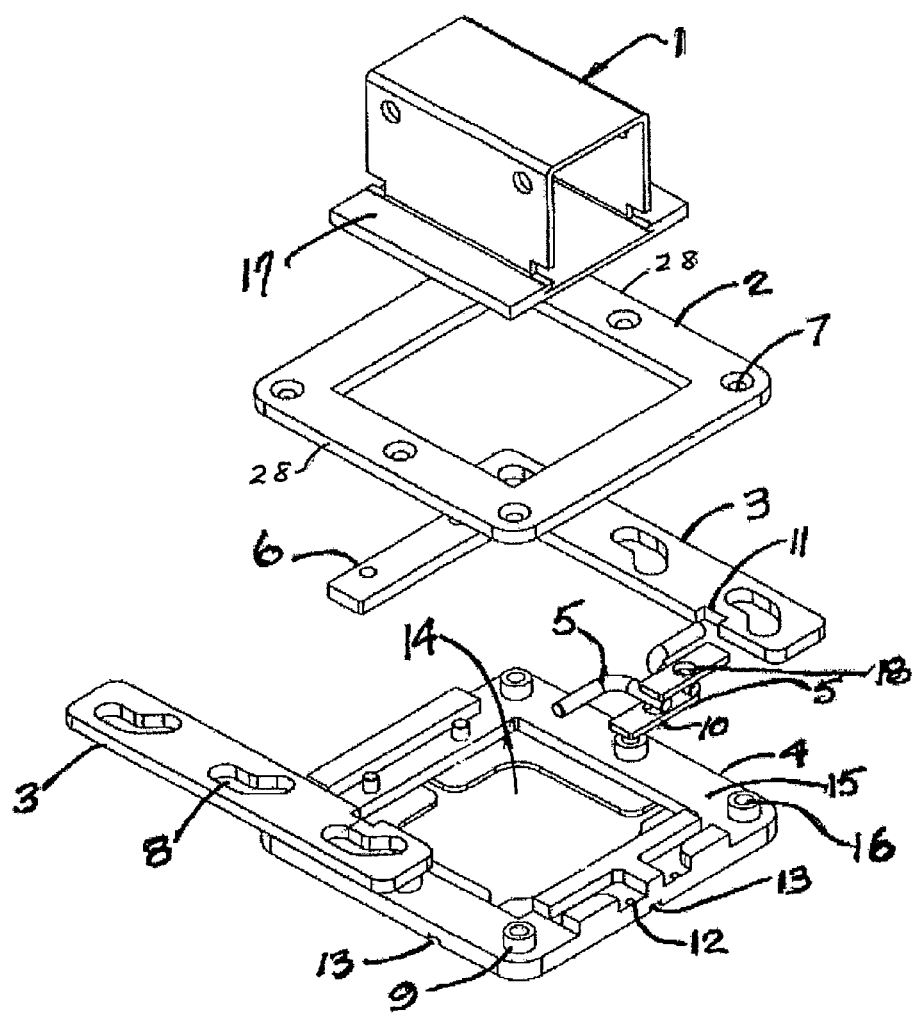
FIG. 1 is an exploded perspective view of a quick-release bracket.

FIGS. 1, 2, 3A, and 3B are perspective views of a quick-release bracket embodying the features of the invention with FIG. 1 being an exploded view thereof. The bracket assembly consists of a top plate 2 having a rectangular shape with holes 7 at each corner and at the center of two opposite sides 28. A generally rectangular base plate 4 underlies the top plate 2 with the center of the base plate forming a pocket 14. The base plate 4 may be of plastic in order to make it resilient. Base plate 4 has holes 16 which align with holes 7 in top plate 2 Holes 16 have bushings 9 which extend above the surface of the base plate 4. On each side 28 there are two opposed retaining plates 3 that are mounted on the base plate 4 such that the extension of the bushings 9 extend into three spaced apart slots 8 formed on each of the two opposite retaining plates 3. Mounting bolts or screws (not shown) are inserted in the top plate holes 7 and into the base plate holes 16 and screw into a deck or platform. Top plate 2 contacts the top of bushings 9 and is, therefore, spaced from the base plate surface 15 by the height of the bushings 9. The top plate 2 holds down the retaining plates 3 that are mounted over the bushings 9 so that the bushings 9 extend through the slots 8 or cut-outs in the retaining plate body 3. Movement of the retaining plates 3 on the bushings 9 causes the retaining plates 3 to move over the pocket 14 of the base plate 4 over the flange 17 of an equipment adapter 1 and hold the equipment adapter 1 in place in the pocket. Reversing the movement of the retaining plates 3 clears the flange 17 so the equipment adapter 1 can be removed.

A top retaining plate 6 can be added to the base plate 4 to support heavier loads. With this plate added, the equipment adapter flange 17 is inserted under the top retaining plate 6 and then pivoted down into the pocket 14.

Retaining plates 3 each have slots 8 which control movement over the bushings 9 so that retaining plates 3 first move lengthwise and then inwardly towards pocket 14. With the tabs 10 aligned, the pin locks 5 are disengaged from notches 11 and retainer plates 3 are free to move away from one another.

Figure 3A:
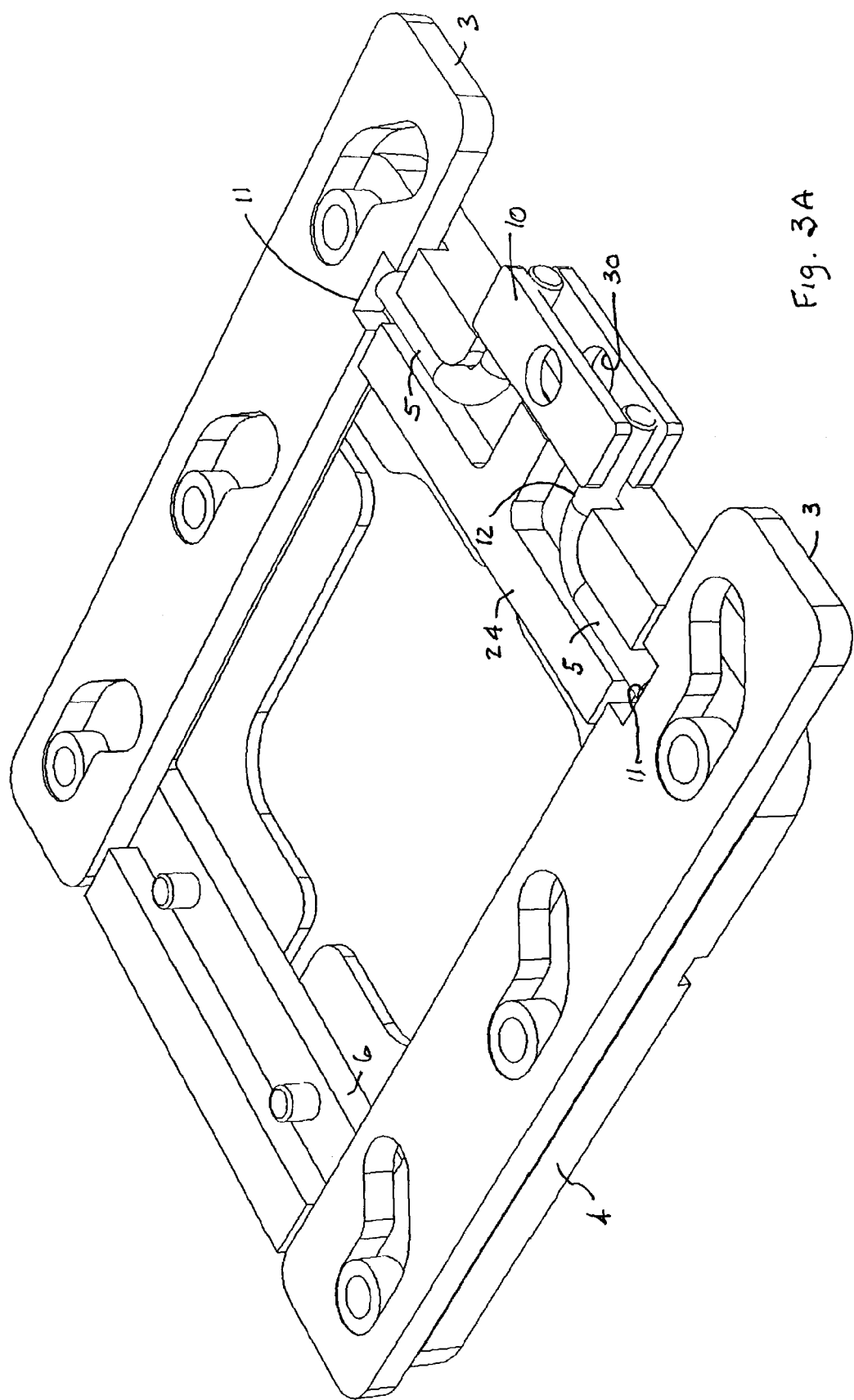
FIG. 3A shows how the pin lock feature holds the sliding type retaining plates in place for security.
Figure 3B:
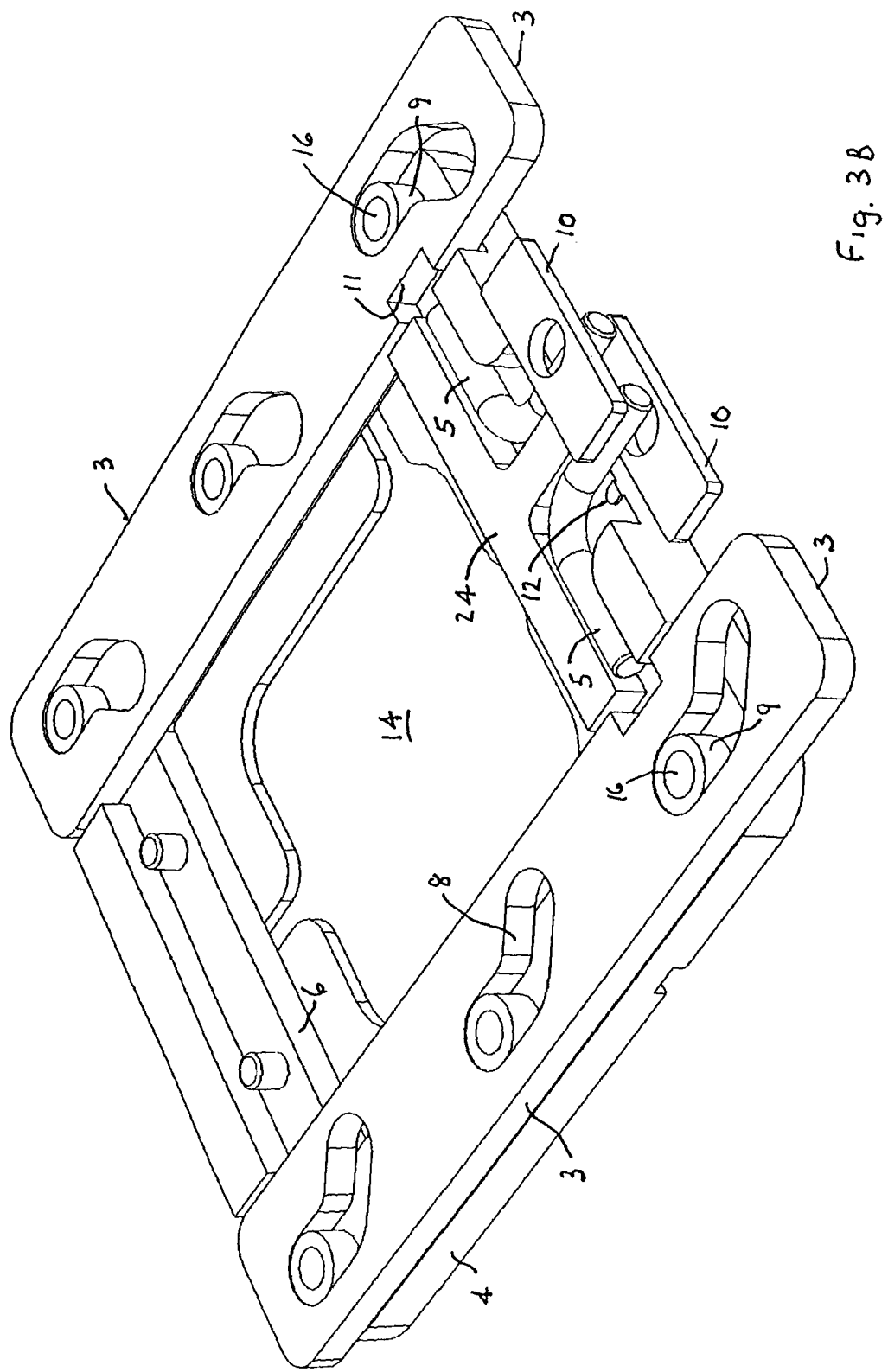
FIG. 3B shows how the pin lock feature opens the sliding type retaining plates to unlock the retaining plates.

Referring to FIGS. 3A and 3B, pin locks 5 are bent at right angles and a tab end remote from a locking end is affixed to a tab 10. When the sliding type retaining plates 3 are in the holding position as shown in FIG. 3A, the pin locks 5 can be manually moved with tabs 10 so the pins extend into the notches 11 on the retaining plates 3 and prevent the retaining plates from moving to release the equipment flange 17. Raised bumps 12 on the pin slots of the base plate 4 hold the pin locks 5 in the locked position. A hole 18 is located in each lock pin tab 10 so a padlock or other means can be inserted in holes 30 in the two tabs 10 to lock them in place, once the holes are aligned.

The equipment flange 1 fits into the bracket pocket 14. Different adapters with plates that fit into the bracket pocket can be designed for a wide variety of equipment and bracket applications. For marine and wet installation applications drainage slots 13 are incorporated in the base plate.

Figure 2:
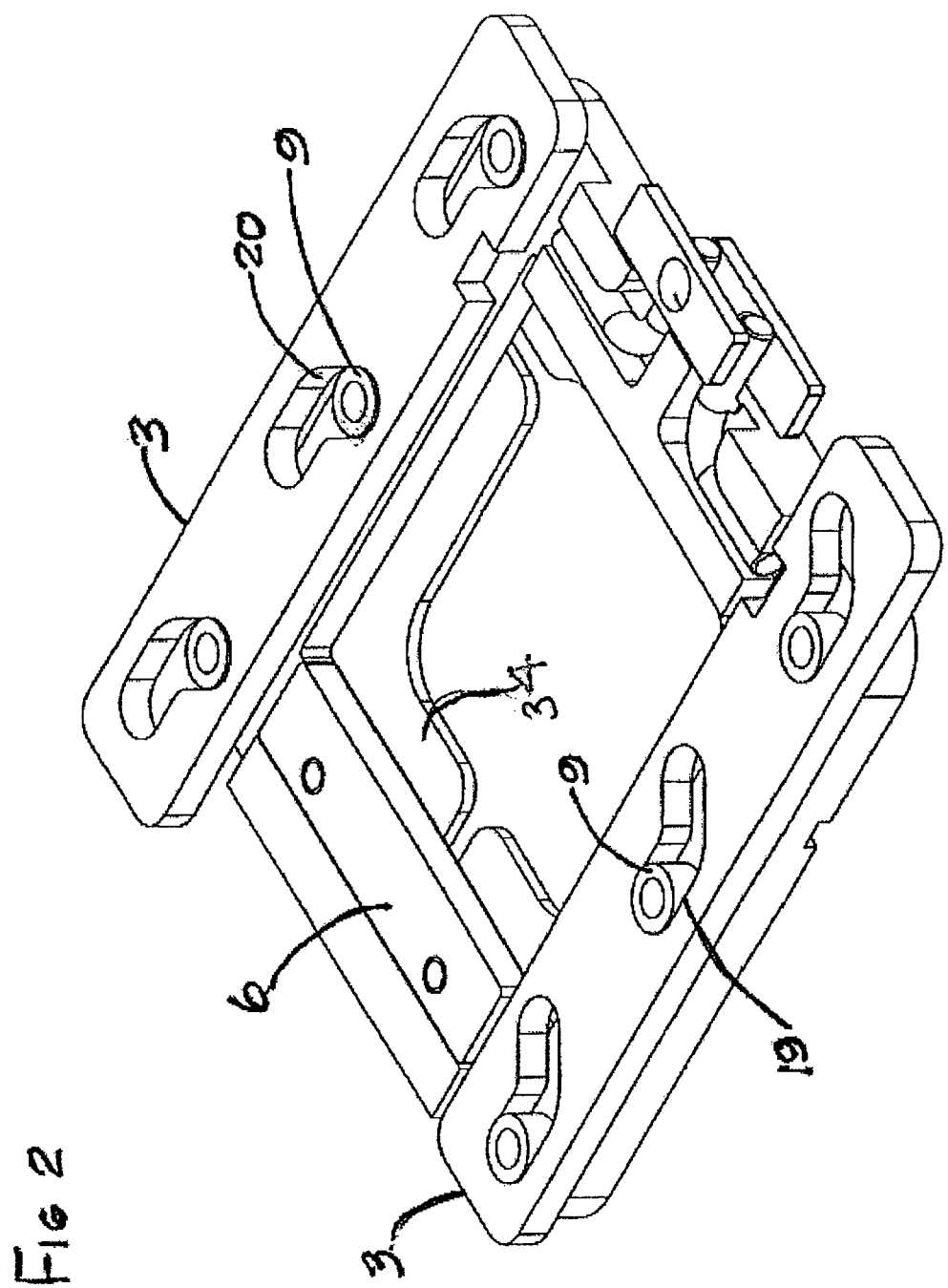
FIG. 2 shows the top plate removed and the way the retaining lock plates hold the equipment insert in the bracket pocket. It also shows the top retaining plate that can be added to support heavier retaining loads.

FIG. 2 shows the top plate 2 removed and the way the retaining plates 3 hold the equipment adapter 1 in the bracket pocket 14. One retainer plate 3 is shown in the locked position 19 on the bolt bushing 9 and the other retaining plate 3 is shown in the open position 20 with the bushing 9 at the end of the inwardly directed portion of the slot 8.

FIG. 3B shows how by squeezing the pin lock 5 tabs 10 in reverse to FIG. 3A, the pins retract out of the retaining plate slot 11 and free the retaining plates 3 to move. The raised bump 12 in the pin slot of the base plate 4 holds the pin locks open.

FIG. 4A shows a pivoting action feature to move an open slot type retaining plate into the insert retaining position. The retaining plate 21 pivots at 22 about an end bolt bushing 9 on the base plate 4. The open slots 23 on the retaining plate 21 clear the bolt bushings 9 when the plate is opened or closed. In the closed position the pivoting retaining plates 21 have holes 24 that align so the bracket can be padlocked or other means for security.

FIG. 4B shows a rotating action feature to move a tab type retaining plate into the insert retaining position. The tab 25 rotates on a bolt bushing 9 on the base plate 4 to move in to lock the equipment adapter 1 or rotate in the opposite direction to release the equipment adapter 1 Stop pins 26 restrict the movement of the tab 25 to an open or closed position.

The use of a plastic base plate 4 permits adjustment of the force needed to open and close the retaining plates 3 by simply tightening or loosening the bracket hold-down bolts or screws (not shown). Tightening the bolts compresses the plastic bushing 9 around each bolt and reduces the clearance between the bracket top plate 2 and the moving retainer plate 3. This creates more friction bewteen the top and bottom surface of the retainer plate 3 in the bracket. Loosening the bolt reduces this friction. In installations where there is limited vibration or stationary mounting, higher friction locking without a security lock pin mechanism in the bracket is practical and still secure against tampering because of the force required to open the bracket.

FIG. 5 shows a typical assembly of the quick-release bracket with sliding retaining plates holding a typical equipment adapter. Hold-down bolts or screws tie the bracket down to the mounting platform.

Accordingly while this invention has been described with reference to illustrative embodiments, this description is not intended to be construed in a limiting sense. Various modifications of the illustrative embodiment will be apparent to those skilled in the art upon reference to this description. It is therefore contemplated that appended claims will cover any such modifications or embodiments as fall within the scope of the invention.

We claim:

1. A quick-release retainer bracket for mounting objects to a platform, comprising:
    (a) a base plate affixable to said platform and enclosing a pocket in a center thereof; and
    (b) a pair of retainer plates positionable on top of said base plate on opposed sides thereof, said base plate and retainer plates mountable on said platform, with said retainer plates moveable over said base plate from a retracted position in which said retainer plates are partially overlapping said pocket to an extended position in which said retainer plates do not overlap said pocket; and
    (c) means for moving said retainer plates reversibly from said retracted position to said extended position;
wherein the retaining plates slide from said extended position to a locking position overlapping said pocket and contacting an equipment adapter guided by slots engaging pivot pins extending up from said base plate through slots in said retainer plates.

2. A quick-release retainer bracket for mounting objects to a platform, comprising:
    (a) a base plate affixable to said platform and enclosing a pocket in a center thereof; and
    (b) a pair of retainer plates positionable on top of said base plate on opposed sides thereof, said base plate and retainer plates mountable on said platform, with said retainer plates moveable over said base plate from a retracted position in which said retainer plates are partially overlapping said pocket to an extended position in which said retainer plates do not overlap said pocket; and
    (c) means for moving said retainer plates reversibly from said retracted position to said extended position;
    (d) an equipment flange, wherein the retaining plates are configured to pivot from a pivot end thereof on guide bushings inwardly to lock the equipment flange in the bracket pocket.

3. A quick-release retainer bracket as in claim 2, wherein said base plate and guide bushings are made of a material deformable under compression so a force required to open and close said retaining plates may be adjusted.

4. A quick-release retainer bracket for mounting objects to a platform, comprising:
    (a) a base plate affixable to said platform and enclosing a pocket in a center thereof; and
    (b) a pair of retainer plates positionable on top of said base plate on opposed sides thereof, said base plate and retainer plates mountable on said platform, with said retainer plates moveable over said base plate from a retracted position in which said retainer plates are partially overlapping said pocket to an extended position in which said retainer plates do not overlap said pocket; and
    (c) means for moving said retainer plates reversibly from said retracted position to said extended position;
wherein said retainer and base plates have a plurality of locking bolt holes which allow locking bolts to clamp a top plate to an underlying platform and thereby provide shear resistance equal to the shear strength of said locking bolts.

5. A quick-release retainer bracket for mounting objects to a platform, comprising:
    (a) a base plate affixable to said platform and enclosing a pocket in a center thereof; and
    (b) a pair of retainer plates positionable on top of said base plate on opposed sides thereof, said base plate and retainer plates mountable on said platform, with said retainer plates moveable over said base plate from a retracted position in which said retainer plates are partially overlapping said pocket to an extended position in which said retainer plates do not overlap said pocket; and
    (c) means for moving said retainer plates reversibly from said retracted position to said extended position;
wherein said base plate has pin receptacles which each receive a locking pin and a distal end of said locking pins releasably engage a corresponding notch in an inside edge of each of said retainer plates.

6. A quick-release retainer bracket as in claim 5, wherein distal ends of said locking pins are affixed to pads which, when moved laterally, move said locking pins into and out of engagement with notches in said retainer plates.

7. A quick-release retainer bracket as in claim 6, wherein said pads each have a hole which is aligned when said locking pins engage said notches and can receive a padlock when said retainer plates are in a locking position.

8. A quick-release retainer bracket for mounting objects to a platform, comprising:
    (a) a base plate affixable to said platform and enclosing a pocket in a center thereof; and
    (b) a pair of retainer plates positionable on top of said base plate on opposed sides thereof, said base plate and retainer plates mountable on said platform, with said retainer plates moveable over said base plate from a retracted position in which said retainer plates are partially overlapping said pocket to an extended position in which said retainer plates do not overlap said pocket; and
    (c) means for moving said retainer plates reversibly from said retracted position to said extended position;
including drainage slots across a bottom of opposite sides of said base plate to drain water from said pocket.

* * * * *